United States Patent
Chong, Jr.

(10) Patent No.: US 7,093,069 B2
(45) Date of Patent: Aug. 15, 2006

(54) INTEGRATION OF A RAID CONTROLLER WITH A DISK DRIVE MODULE

(75) Inventor: Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 590 days.

(21) Appl. No.: 10/262,158

(22) Filed: Sep. 30, 2002

(65) Prior Publication Data

US 2004/0064638 A1    Apr. 1, 2004

(51) Int. Cl.
*G06F 12/00* (2006.01)
(52) U.S. Cl. ............................ 711/114; 711/170
(58) Field of Classification Search ............ 711/114, 711/170, 172; 714/7–8
See application file for complete search history.

(56) References Cited

U.S. PATENT DOCUMENTS

| 5,729,763 | A  | * | 3/1998 | Leshem .................... 710/38 |
| 6,178,520 | B1 |   | 1/2001 | DeKoning et al. |
| 6,275,898 | B1 |   | 8/2001 | DeKoning |
| 6,304,942 | B1 | * | 10/2001 | DeKoning ................. 711/114 |
| 6,457,098 | B1 | * | 9/2002 | DeKoning et al. .......... 711/114 |
| 6,880,059 | B1 | * | 4/2005 | Mizuno et al. ............. 711/170 |
| 6,954,824 | B1 | * | 10/2005 | Burton et al. ............. 711/114 |

* cited by examiner

*Primary Examiner*—Denise Tran
(74) *Attorney, Agent, or Firm*—Blakely, Sokoloff, Taylor & Zafman LLP

(57) ABSTRACT

In one embodiment, a disk array storage system includes multiple disk drive modules that contain sets of drives and a number of storage controllers. Each storage controller is connected to a group of disk drives from two or more disk drive modules. The number of disk drives from the same disk drive module that are connected to the storage controller does not exceed a predefined number.

20 Claims, 14 Drawing Sheets

INTEGRATION OF A RAID CONTROLLER WITH A DISK DRIVE MODULE

FIELD OF THE INVENTION

This invention relates generally to data storage arrays, and more particularly, to integration of a storage controller with a disk drive module.

BACKGROUND OF THE INVENTION

Modern mass storage systems are growing to provide increasing storage capacities to fulfill increasing user demands from host computer system applications. Due to this critical reliance on large capacity mass storage, demands for enhanced reliability are also high. A popular solution to the need for increased reliability is redundancy of component level subsystems. In managing redundant storage devices such as disk drives it is common to utilize Redundant Array of Independent Disks (commonly referred to as RAID) storage management techniques. RAID techniques generally distribute data over a plurality of smaller disk drives. RAID controllers within a RAID storage subsystem hide this data distribution from the attached host systems such that the collection of storage (often referred to as a logical unit or LUN) appears to the host as a single large storage device.

To enhance (restore) the reliability of the subsystem having data distributed over a plurality of disk drives, RAID techniques generate and store in the disk drives redundancy information (e.g., XOR parity corresponding to a portion of the stored data). A failure of a single disk drive in such a RAID array of disk drives will not halt operation of the RAID subsystem. The remaining available data and/or redundancy data is used to recreate the data missing due to the failure of a single disk drive. Furthermore, the RAID management software within the controller(s) of the subsystem facilitates continued data availability within the LUN when a failed disk drive is removed.

FIG. 1 illustrates a logical view of a typical RAID level 5 (RAID-5) system 100, in which four storage controllers 102 through 108 are connected to subsets of disk drives 110 through 116 respectively. Each subset of disk drives corresponds to a RAID-5 LUN that is controlled by a storage controller. For example, LUN 118 is composed of the disk drive subset 110 and is controlled by the storage controller 102. If a disk drive in the subset 110 fails, the management software in the storage controller 102 facilitates availability of data within LUN 118 while the failed disk drive is being replaced with a new disk drive. However, if the controller 102 fails, the data within LUN 118 becomes unavailable until the failed controller is replaced.

Problems caused by a controller failure are typically addressed using a dual controller configuration. FIG. 2 illustrates a logical view of a conventional RAID level 5 (RAID-5) system 100 that includes two dual controller disk storage subsystems. In each dual controller subsystem, a disk drive can be accessed by either controller. Single disk drive failures can be accommodated by the RAID management software described above. In the event of a single controller failure, the other controller assumes the responsibility for the failing controller's disk drives. For example, a disk drive in a subset 210 can be accessed by either controller 202 or 204. If a disk drive in the subset 210 is removed, the management software within the controller 202 provides continued availability of data within LUN 218. If the controller 202 fails, the controller 204 assumes the responsibility for the subset 210 and the LUN 218.

The storage systems discussed above utilize disk drives and storage controllers that are field replaceable units (FRUs). With an expected migration to smaller disk drives (e.g., from 3½" disk drives to 2½" disk drives), the use of modules containing groups of disk drives has been proposed. Such a module may be in the form of a "blade" which includes a number of disk drives mounted on a blade connector. If any disk drive fails, the whole blade is removed from the storage enclosure, making data within a corresponding LUN unavailable. In addition, if for packaging-related reasons, efficiency or any other reasons, the whole blade (rather than an individual failed disk drive) needs to be replaced, the data stored on the disk drives of the blade will be lost. Furthermore, if the blade also includes an onboard storage controller, then the failure of any disk drive on the blade will result in the removal of the blade with the storage controller and the disk drives, thus rendering data in all the LUNs associated with this storage controller unavailable and, if the whole blade needs to be replaced, causing the data stored on the disk drives of this blade to be lost.

SUMMARY OF THE INVENTION

The present invention relates to various aspects of organizing disk drive modules with onboard storage controllers.

In one aspect of the invention, a disk array storage system includes multiple disk drive modules that contain sets of disk drives and a number of storage controllers. Each storage controller is connected to a group of disk drives from two or more disk drive modules. The number of disk drives from the same disk drive module that are connected to the storage controller does not exceed a predefined number.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

As will be discussed in more detail below, an embodiment of the present invention provides a disk array storage system including multiple disk drive modules that contain sets of disk drives and a number of storage controllers. Each storage controller is connected to a group of disk drives from two or more disk drive modules. The number of disk drives from the same disk drive module that are connected to the storage controller does not exceed a predefined number. In one embodiment, the predefined number is a maximum number of disk drives that can be missing from a logical unit number (LUN) associated with data managed by a storage controller without causing loss of the data within the LUN.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 3A:
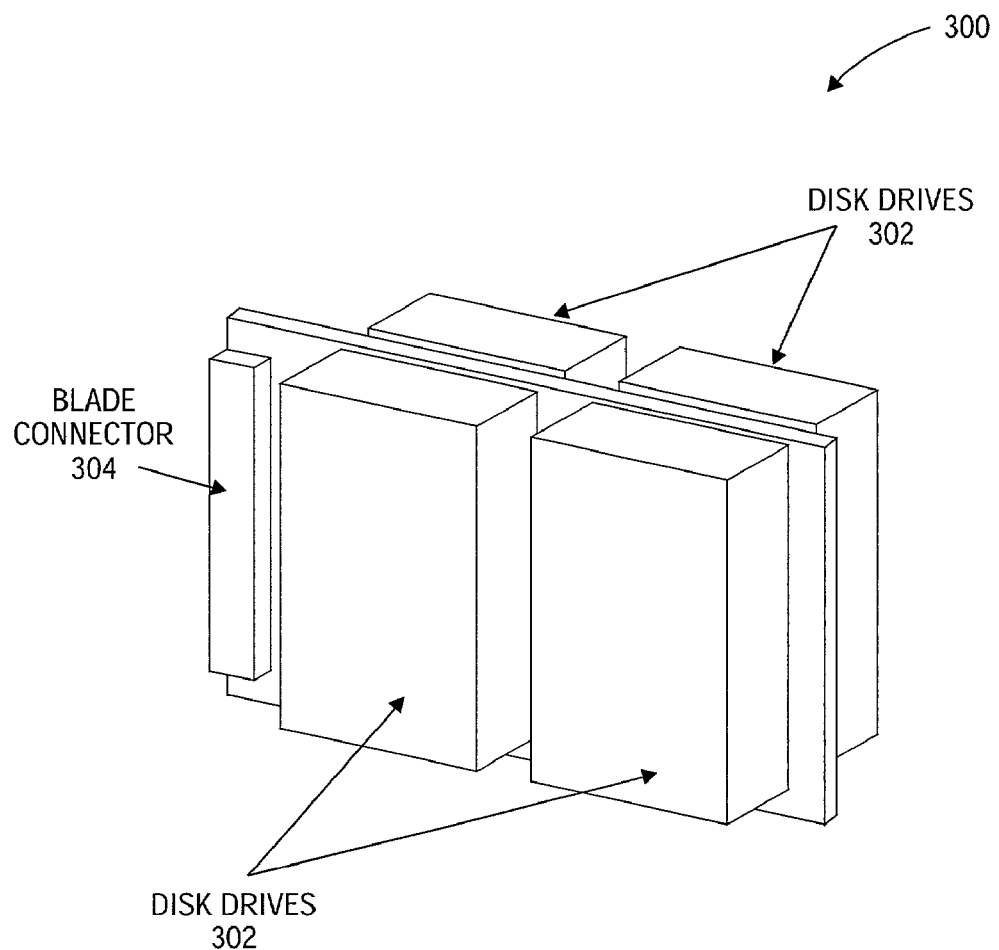
FIGS. 3A and 3b illustrate exemplary disk drive modules in the form of blades.
Figure 3B:
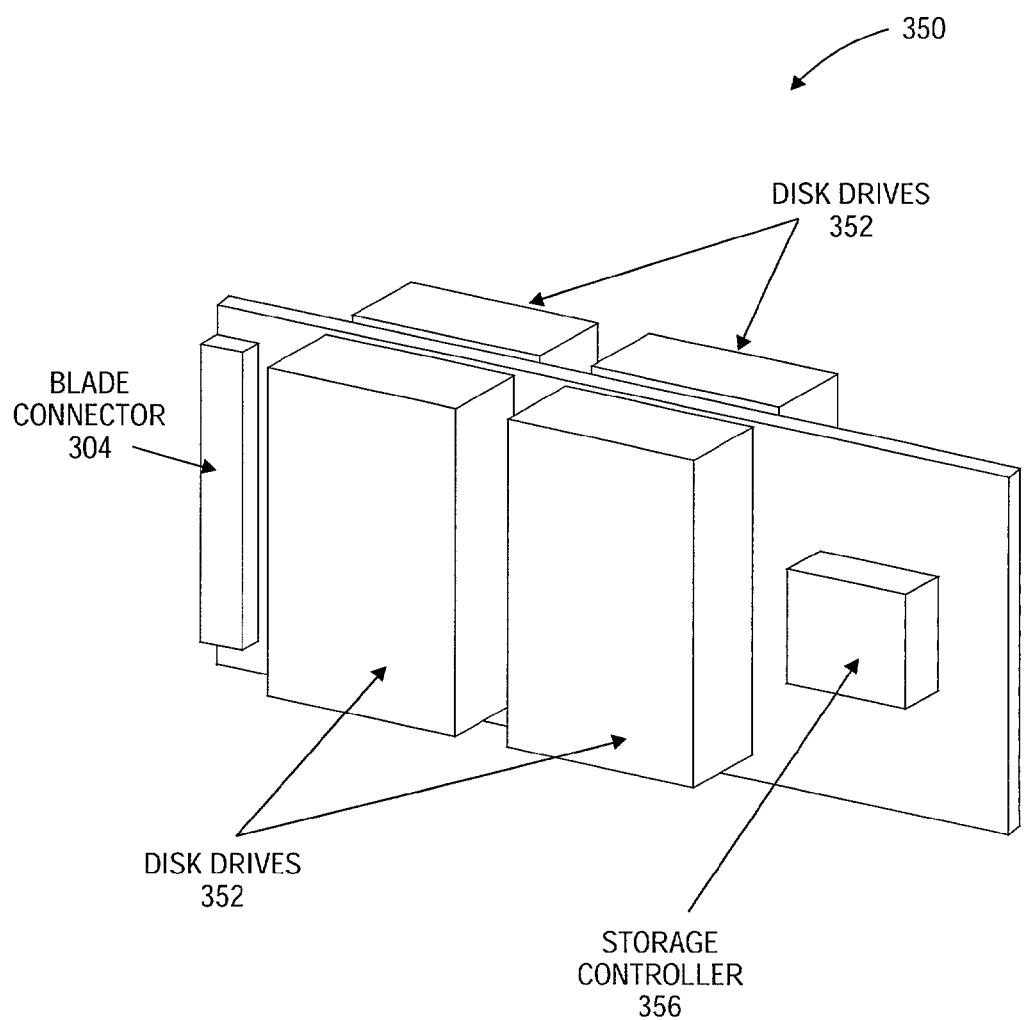

FIGS. 3A and 3B illustrate exemplary disk drive modules. Referring to FIG. 3A, a disk drive module 300 is shown in the form of a "blade," which includes a set of disk drives 302 mounted on a blade connector 304. If any disk drive 302 fails, the whole blade 300 is removed from the storage enclosure. In addition, because of packaging, efficiency and various other reasons, the whole blade 300 may need to be replaced when one of disk drives 302 fails.

Referring to FIG. 3B, a blade 350 includes a set of disk drives 352 and a storage controller 356. If one of disk drives 352 fails, the whole blade 350 will need to be removed, including the storage controller 356. If the storage controller 356 is connected to the disk drives 352, then the removal of the blade 350 containing the storage controller will render data in all LUNs associated with the storage 356 controller unavailable. In addition, if the blade 350 needs to be replaced, then the data stored on the disk drives 352 will be lost.

Embodiments of the present invention address the above problems caused by the integration of storage controllers with disk drive modules such as blades. In particular, the storage controllers and disk drives are connected in such a manner as to have disk drives of each storage controller be distributed over the blades so that no blade contains more than a predefined number of disk drives of a given storage controller. In one embodiment, this predefined number represents a maximum number of disk drives that can be missing from a LUN associated with data controlled by a storage controller without causing loss of data within the LUN. This maximum number may be equal to 1, 2 or any other number, depending on the configuration of the storage controllers and the number of disk drives within a LUN. In a typical RAID system, the maximum number is equal to 1, i.e., management software in a RAID controller can usually compensate only for a single disk drive missing from the LUN using the other data and/or redundancy information. In a RAID system, in which the maximum number is equal to 1, a blade may have no disk drive connected to a given RAID controller or one disk drive connected to the given RAID controller. In one embodiment, a blade may include concatenated disk drives acting as one disk drive in the RAID stripe. In this embodiment, each of the concatenated disk drives can be connected to one RAID controller.

Accordingly, the distribution of disk drives of each storage controller over multiple blades enables the reconstruction of data that was stored on disk drives of a removed blade after the removed blade is replaced with a new blade.

Figure 4A:
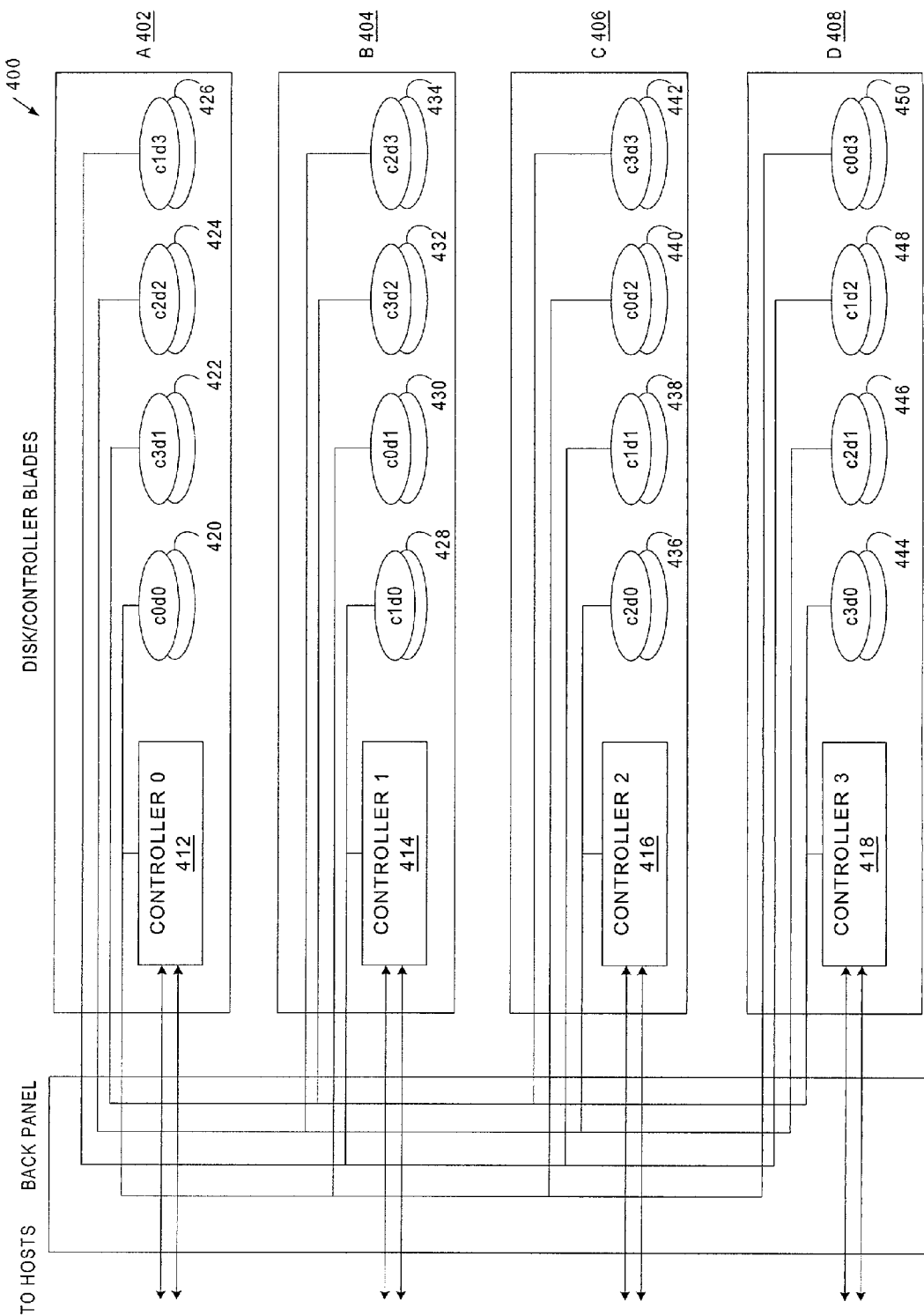
FIG. 4A is a block diagram of a single-controller RAID system, according to one embodiment of the present invention.

FIG. 4A is a block diagram of one embodiment of a RAID system 400. The system 400 includes four blades 402 through 408, with each blade including a controller and four disk drives. The controllers 412 through 418 and the disk drives 420 through 450 are organized in such a way as to prevent loss of data if any blade needs to be replaced (e.g., due to a failed disk drive or a failed storage controller). Specifically, the controller 412 that is mounted on the blade 402 is connected to a disk drive 420, which is also mounted on the blade 402, a disk drive 430 from the blade 404, a disk drive 440 from the blade 406 and a disk drive 450 from the blade 408. The controller 414 that is mounted on the blade 404 is connected to a disk drive 428, which is also mounted on the blade 404, a disk drive 438 from the blade 406, a disk drive 448 from the blade 408 and a disk drive 426 from the blade 402. Next, the controller 416 that is mounted on the blade 406 is connected to a disk drive 436, which is also mounted on the blade 406, a disk drive 446 from the blade 408, a disk drive 424 from the blade 402 and a disk drive 434 from the blade 404. Further, the controller 418 that is mounted on the blade 408 is connected to a disk drive 444, which is also mounted on the blade 408, a disk drive 422 from the blade 402, a disk drive 432 from the blade 404 and a disk drive 442 from the blade 406. Thus, each storage controller has its disk drives distributed over four storage controllers. This distribution prevents loss of data when a blade is replaced, as illustrated in FIGS. 4B and 4C.

Figure 4B:
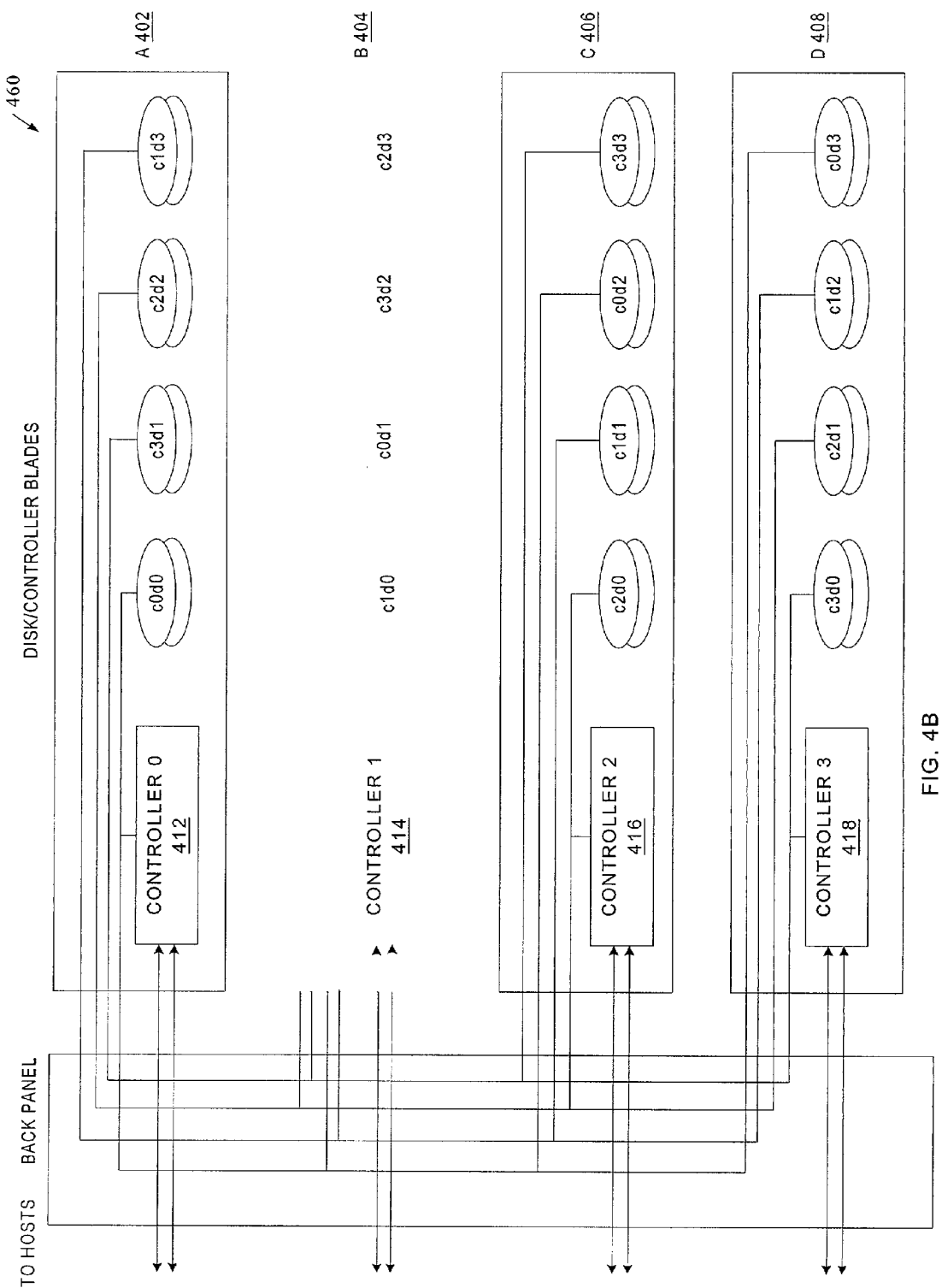
FIGS. 4B and 4C illustrate the operation of a single-controller RAID system when one blade is removed, according to one embodiment of the present invention.

Referring to FIG. 4B, a disk array storage system 460 with a removed blade 404 is illustrated. Because the blade 404 is removed, its constituents such as the controller 414 and the disk drives 428 through 434 are removed as well.

Figure 4C:
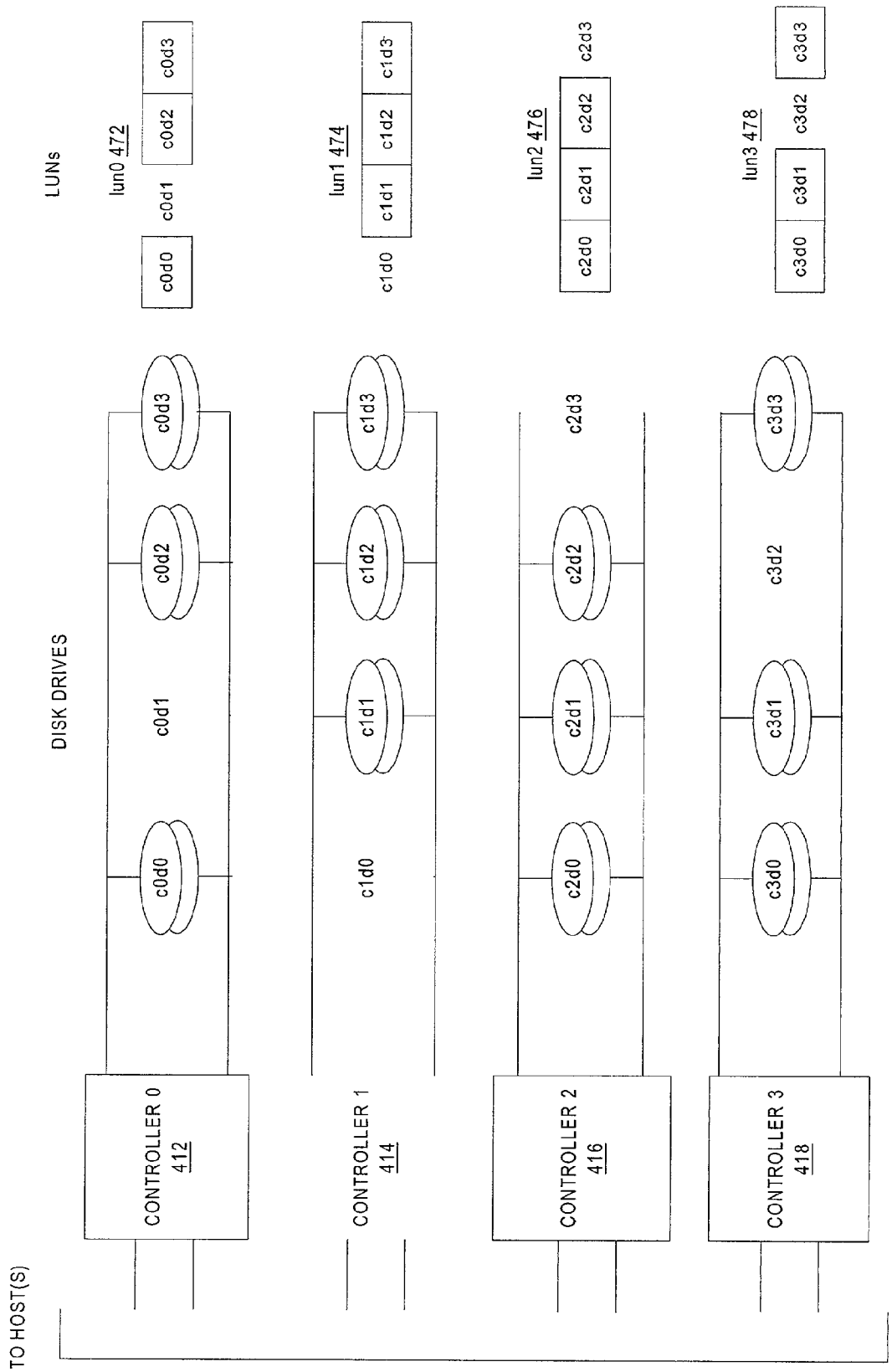

Referring to FIG. 4C, a logical view 470 of the system 460 is illustrated. The logical view shows LUNs 472 through 478 and their RAID set components. As illustrated, each LUN has one disk drive missing as a result of the removal of the blade 404. Because RAID management software in the controllers 412, 416 and 418 can compensate for a single missing disk drive, the availability of data within LUNs 472, 476 and 478 will not be disrupted by the removal of the blade 404 (although LUNs 472, 476 and 478 may run in degraded mode since they have missing disk drives). In addition, once the blade 404 is replaced with a new blade, the management software in the controllers 412 through 418 will reconstruct data of the removed disk drives using the other data and/or redundancy information within the LUNs 472 through 478.

Figure 1:
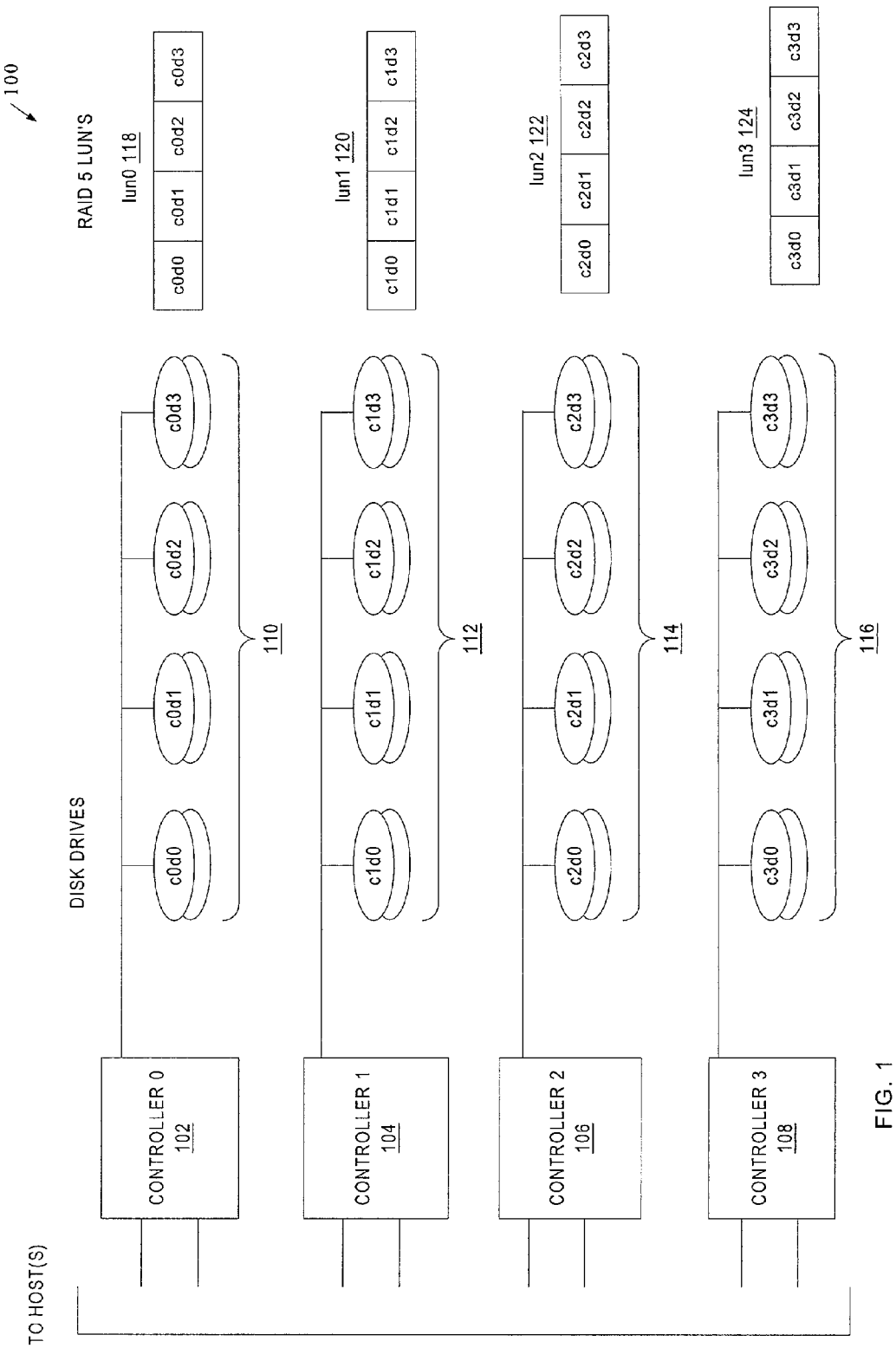
FIG. 1 illustrates a logical view of a prior art single-controller RAID system.
Figure 2:
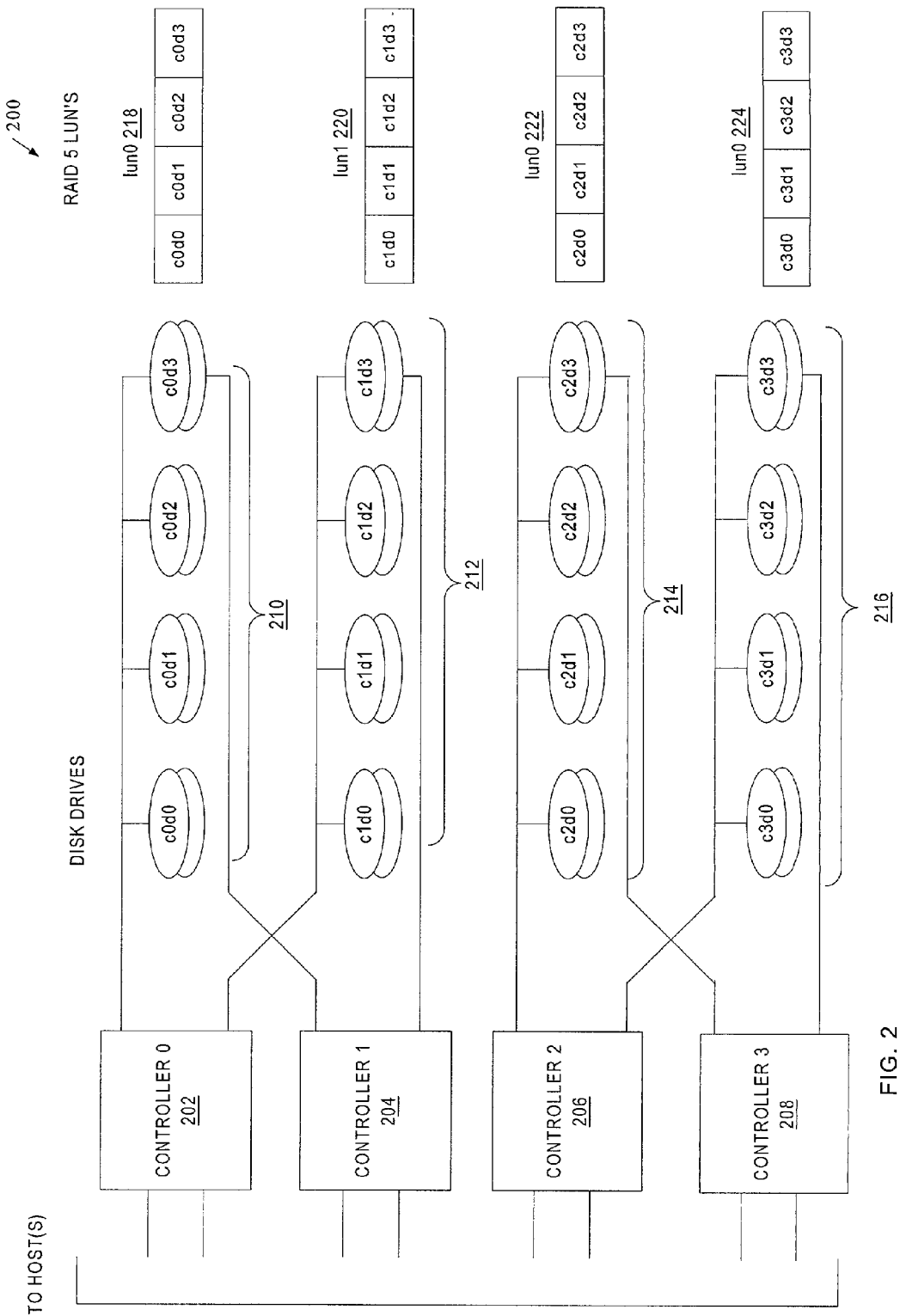
FIG. 2 illustrates a logical view of a prior art dual-controller RAID system.

As discussed above, data within the LUN 474 was unavailable while the blade 404 was removed. In one embodiment, continued availability of data is provided during the removal of a blade by using sets of associated controllers. Each set of associated controllers includes two or more controllers wired together to be able to access each other's disk drives. If one or more controllers in the set fail, the remaining controller can assume responsibility for the disk drives of the failing controller(s). Examples of sets of two associated controllers are shown in FIG. 2 as paired controllers 202 through 206 (also referred to herein as dual controllers).

Figure 5A:
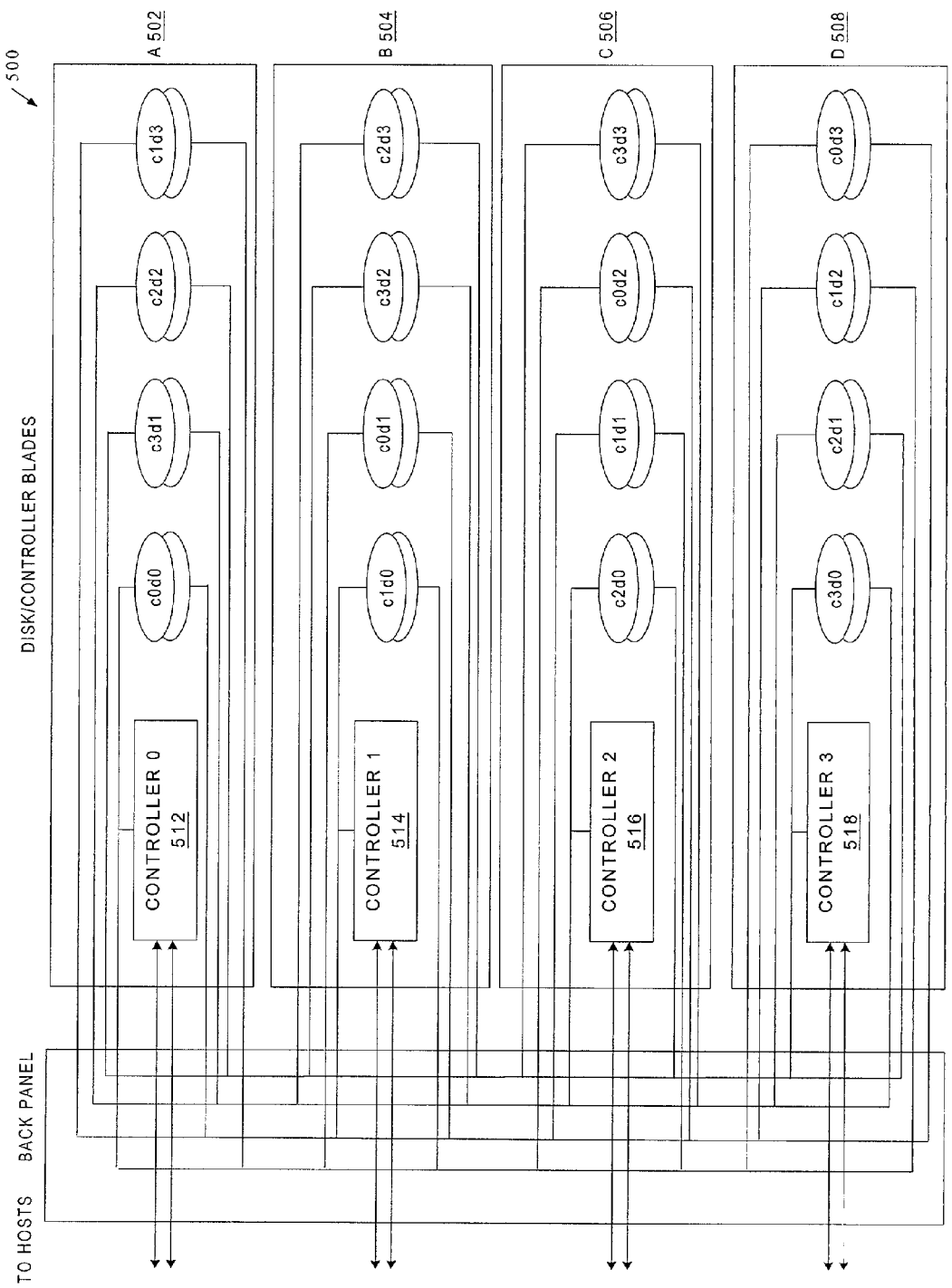
FIG. 5A is a block diagram of a dual-controller RAID system, according to one embodiment of the present invention.

FIG. 5A is a block diagram of a paired-controller RAID system 500. The system 500 includes blades 502 through 508, with each blade containing a controller and four disk drives. As discussed above, each controller has its disk drives distributed over multiple blades to prevent loss of data if any blade needs to be replaced. In addition, the controllers 512 and 514 and the controllers 516 and 518 are wired in active-active pairs to allow one controller from the pair to assume responsibility for the other controller's disk drives if the other controller is removed (e.g., due to a failure of the other controller or any disk drive on the other controller's blade).

Accordingly, each controller is connected to its disk drives (consisting of one specific disk drive from each of the four blades 502 through 504) and to the disk drives of the paired controller. Such organization of the controllers and the disk drives in the system 500 prevents loss of data when a blade is replaced and provides continued availability of data while a blade is removed, as illustrated in FIGS. 5B and 5C.

Figure 5B:
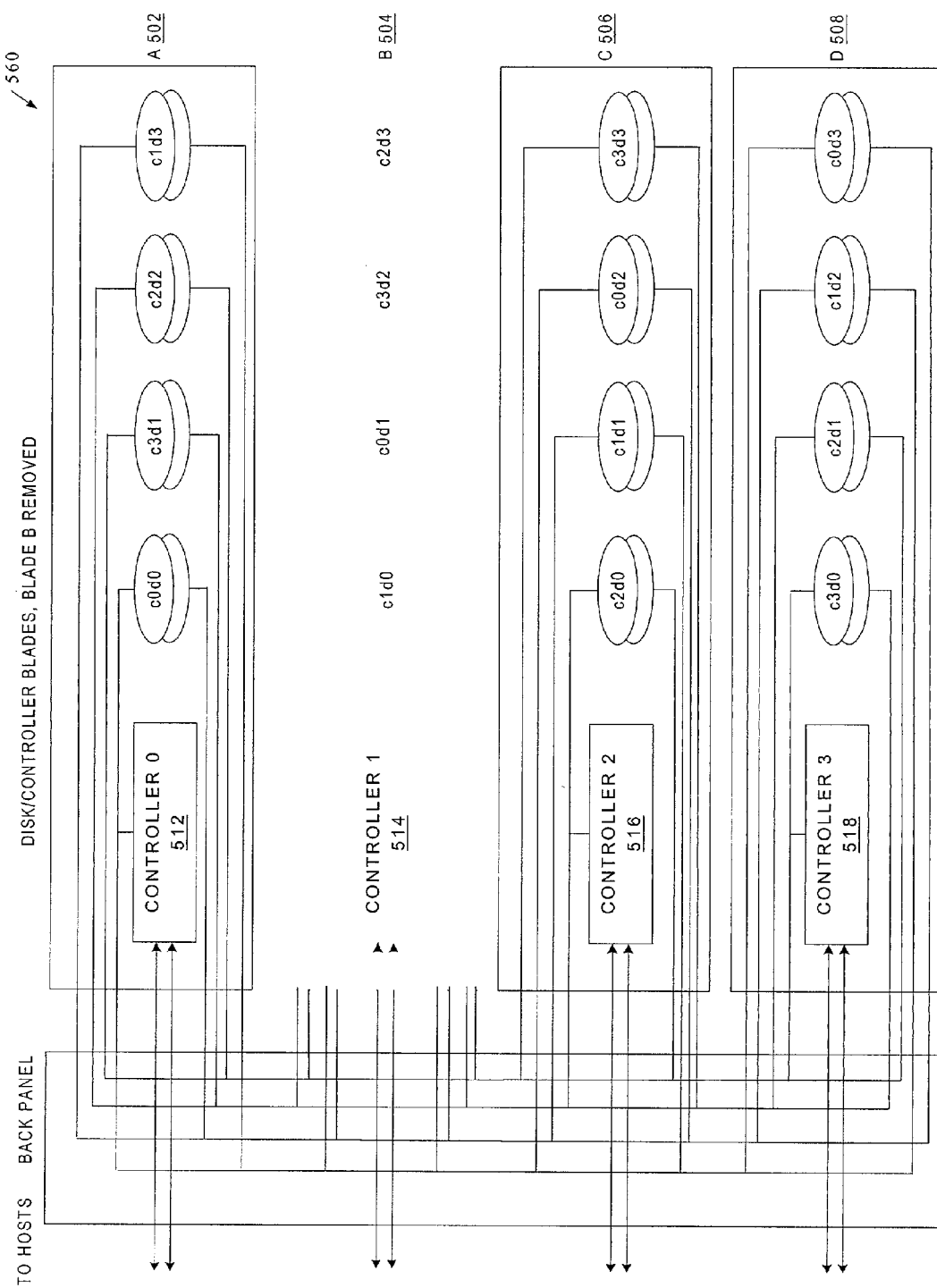
FIGS. 5B and 5C illustrate the operation of a dual-controller RAID system when one blade is removed, according to one embodiment of the present invention.

Referring to FIG. 5B, a disk array storage system 560 with a removed blade 504 is illustrated. Because the blade 504 is removed, its controller 414 and disk drives are removed as well.

Figure 5C:
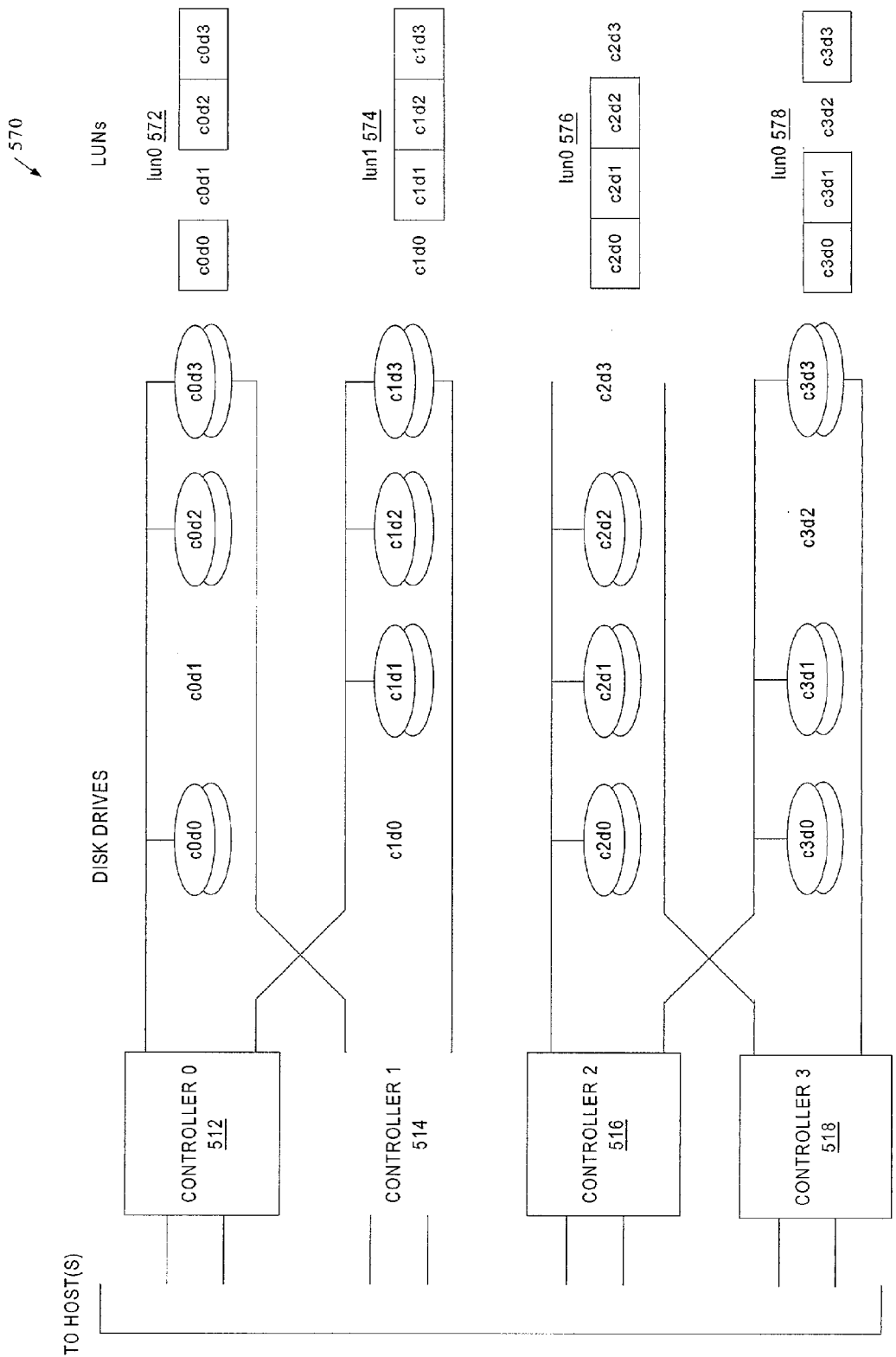

Referring to FIG. 5C, a logical view 570 of the system 560 is illustrated. The logical view shows LUNs 572 through 578 and their RAID set components. As illustrated, each LUN has one disk drive missing as a result of the removal of the blade 504. Because RAID management software in the controllers 512, 516 and 518 can compensate for a single missing disk drive, the availability of data within LUNs 572, 576 and 578 will not be disrupted by the removal of the blade 504. In addition, since the controller 512 assumes the responsibility for the disk drives of the missing controller 514, its management software will compensate for a single missing disk drive in LUN 574, resulting in continued availability of data within LUN 574 as well. Thus, the removal of the blade 504 will not disturb availability if data within any LUN.

Once the blade 504 is replaced with a new blade, the management software in the controllers 412 through 418 will reconstruct data of the removed disk drives using the other data and/or redundancy information within the LUNs 572 through 578.

It should be noted that while the embodiments of the present invention are described with respect to blades, it will be appreciated by those skilled in the art that these embodiments will find application with various other types of disk drive modules that contain disk drives and storage controllers. Further, although FIGS. 4A–5C illustrate storage systems, in which each blade has an onboard controller, embodiments of the present invention can be used in systems that include blades that do not have onboard controllers, blades that have more than one onboard controller, controllers that are FRUs, or various other combinations.

Figure 6:
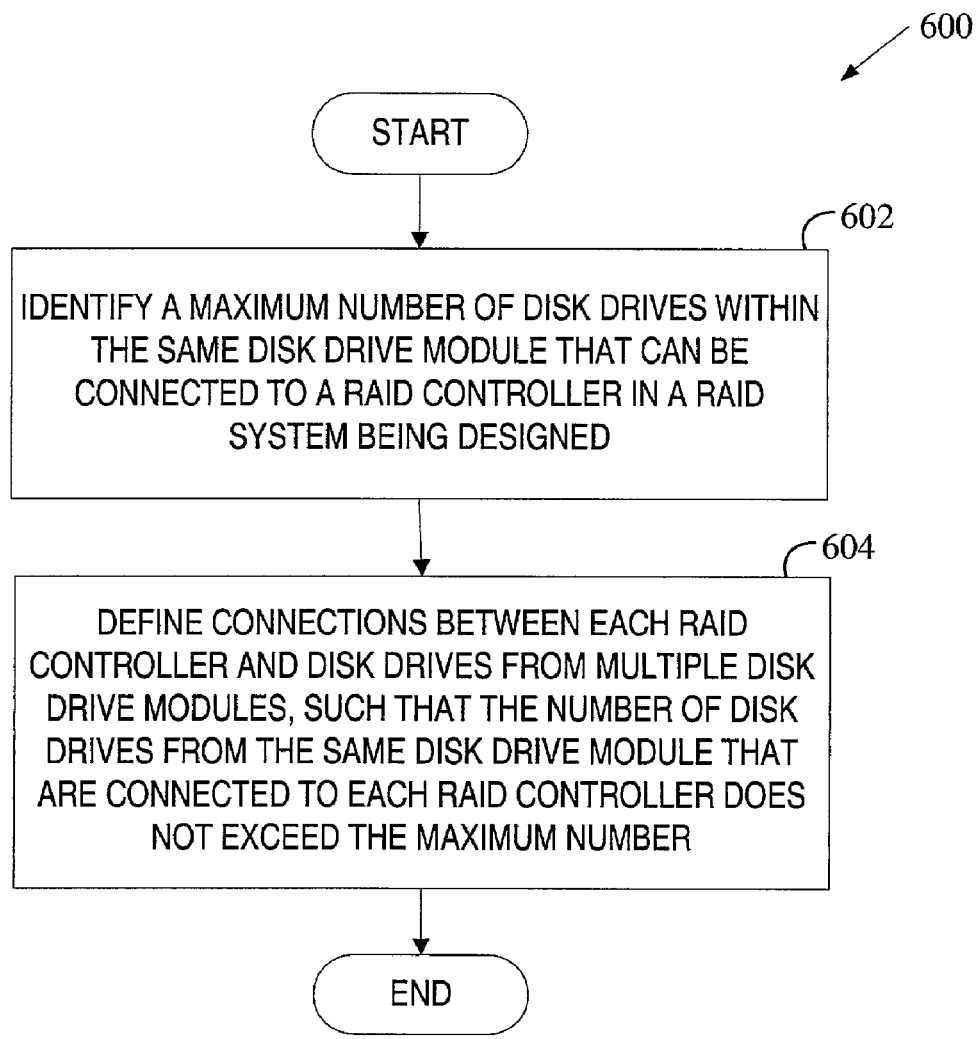
FIG. 6 is a flow diagram of a method 600 for facilitating availability of data in a RAID system.

FIG. 6 is a flow diagram of a method 600 for facilitating availability of data in a RAID system. The RAID system includes disk drive modules (e.g., blades) containing sets of disk drives. In one embodiment, each disk drive module also contains one or more onboard RAID controllers. Alternatively, only a portion of disk drive modules contains onboard RAID controllers.

The RAID controllers in the RAID system may consist of single RAID controllers, sets of associated RAID controllers (e.g., sets of paired controllers or sets of three or more controllers coupled together), or any combination of the above.

Method 600 may be automated (i.e., executed without user intervention) or semi-automated (i.e., executed with some user intervention). In one embodiment, method 600 is performed during the design of the RAID system.

Method 600 begins with identifying a maximum number of disk drives within a single disk drive module that can be connected to a RAID controller (processing block 602). Two alternative embodiments for identifying the maximum number of disk drives will be discussed in more detail below with reference to FIGS. 7A and 7B.

At processing block 604, the maximum number is used to define connections between each RAID controller and disk drives. In particular, each RAID controller is to be connected to disk drives from various disk drive modules, with the number of disk drives from a single disk drive module not exceeding the maximum number identified at processing block 602.

Figure 7A:
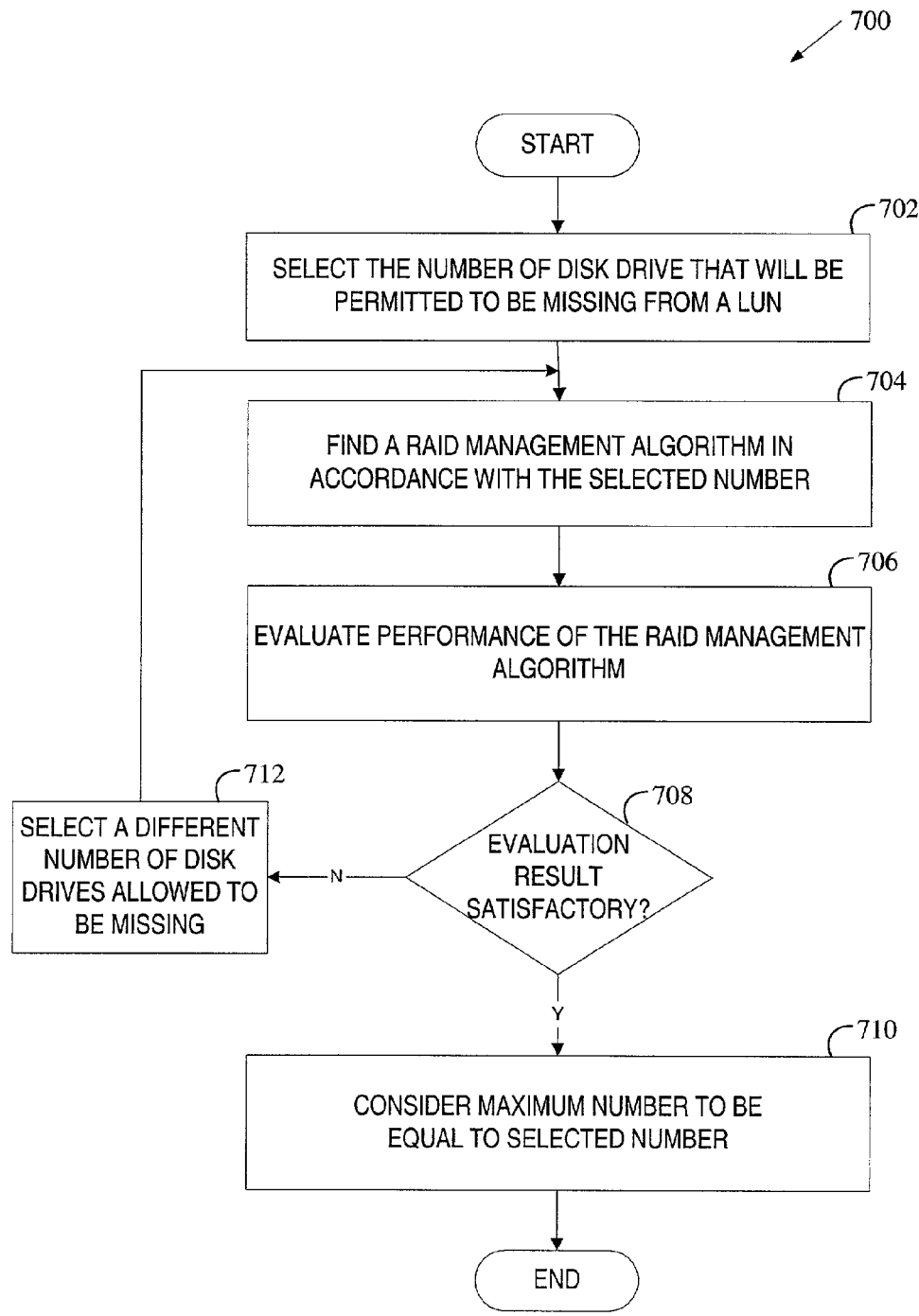
FIGS. 7A and 7B illustrate two alternative embodiments of a method for identifying the maximum number of disk drives within a single disk drive module that can be connected to a RAID controller.
Figure 7B:
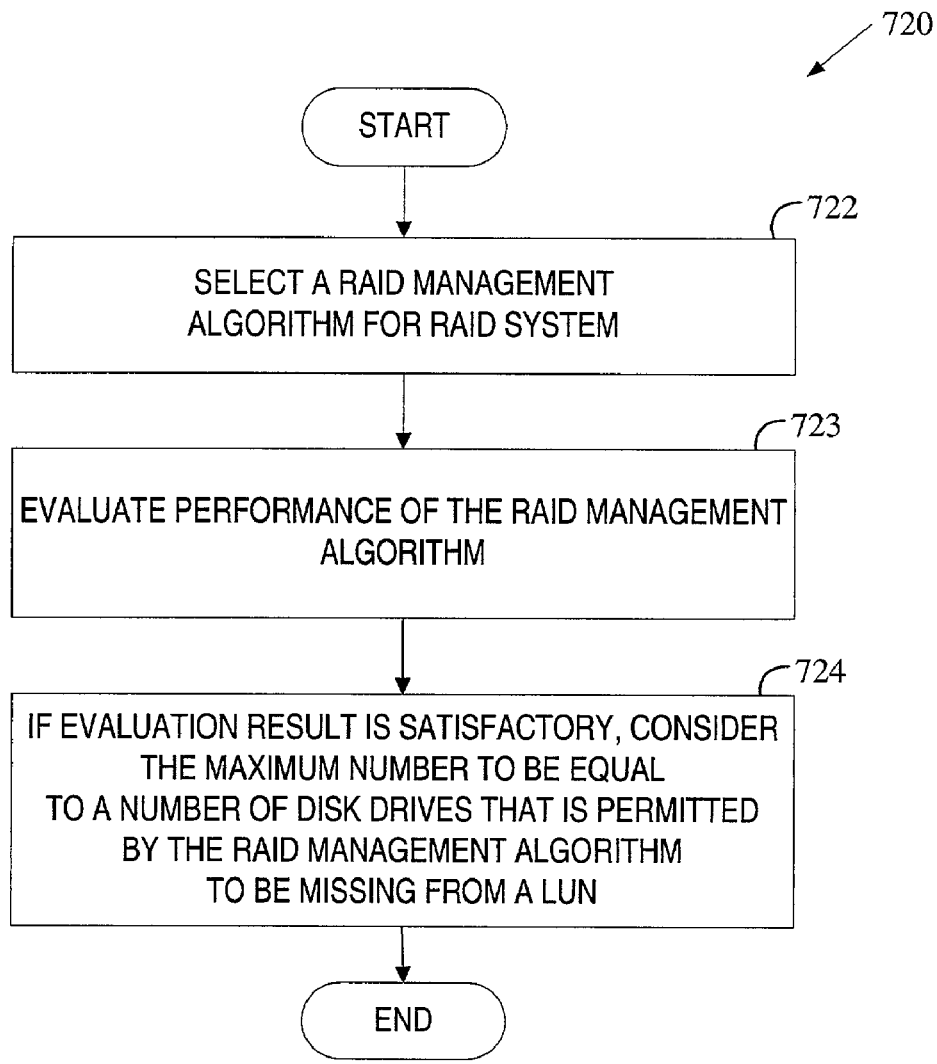

FIGS. 7A and 7B illustrate two alternative embodiments of a method for identifying the maximum number of disk drives within a single disk drive module that can be connected to a RAID controller. In each of these embodiments, the method may be automated or semi-automated.

Referring to FIG. 7A, method 700 begins with selecting the number of disk drives that will be permitted to be missing from a LUN in the RAID system (i.e., the maximum number of disk drives that can be missing from a LUN without causing loss of data within the LUN) (processing block 702). In one embodiment, the selected number is specified by the user.

Next, a RAID management algorithm is found that allows the selected number of disk drives to be missing from a LUN while preventing loss of data within the LUN (processing block 704). Further, the performance of this RAID management algorithm is evaluated (processing block 706). The evaluation may be done based on statistical data identifying reliability of RAID systems that used the RAID algorithm, the number of redundant components required by the RAID algorithm, statistical data identifying reliability of components to be used in the RAID system, operational performance of the RAID system, the cost of the RAID system, and various other factors. In one embodiment, the above factors are balanced according to a particular formula.

At decision box 708, a determination is made as to whether the evaluation result is satisfactory (e.g., the evaluation result computed according to the formula is above a threshold value). If the determination is positive, then, at processing block 710, the maximum number of disk drives within a single disk drive module that can be connected to a RAID controller is considered to be equal to the number selected at processing block 702. Otherwise, a different number of disk drives allowed to be missing from a LUN is selected and processing blocks 740 through 708 are repeated until the evaluation produces a satisfactory result.

Referring to FIG. 7B, method 720 begins with selecting a RAID management algorithm for the RAID system being designed (processing block 722). Next, the performance of this RAID management algorithm is evaluated (processing block 723). As discussed above, the evaluation may be done based on statistical data identifying reliability of RAID systems that used the RAID algorithm, the number of redundant components required by the RAID algorithm, statistical data identifying reliability of components to be used in the RAID system, operational performance of the RAID system, the cost of the RAID system, and various other factors. In one embodiment, the above factors are balanced according to a particular formula.

If the evaluation result is satisfactory (e.g., the formula produces a result exceeding a threshold value), the maximum number of disk drives within a single disk drive module that can be connected to a RAID controller is considered to be equal to the number of disk drives that is permitted by the RAID management algorithm to be missing from LUN while preventing loss of data within the LUN (processing block 724).

Figure 8:
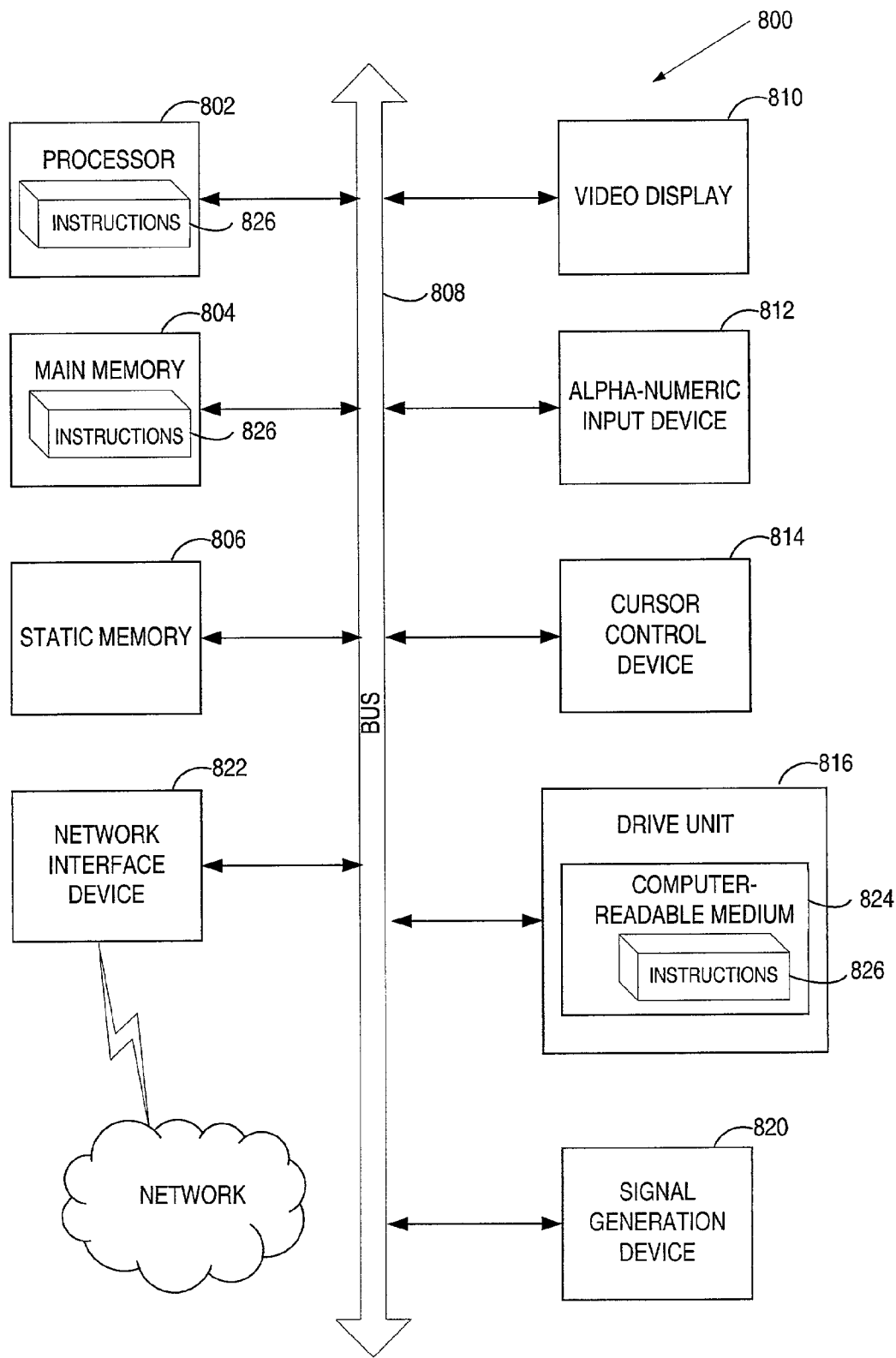
FIG. 8 is a block diagram of one embodiment of a computer system implementing embodiments of the present invention.

FIG. 8 shows a diagrammatic representation of a machine in the exemplary form of a computer system 800 within which a set of instructions, for causing the machine to perform any one of the methodologies discussed above with reference to FIGS. 6, 7A and 7B, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802 and a main memory 804, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (i.e., software) 826 embodying any one, or all, of the methodologies described above. The software 826 is also shown to reside, completely or at least partially, within the main memory 804 and/or within the processor 802. The software 826 may further be transmitted or received via the network interface device 822. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method of facilitating availability of data in a RAID system in which each of a plurality of disk drive modules comprises at least two of a plurality of disk drives, the method comprising:
    identifying a maximum number of disk drives within any one of the plurality of disk drive modules that can be connected to one of a plurality of RAID controllers, wherein the maximum number is based on a RAID management algorithm and is the number of disk drives permitted to be missing from any one of a plurality of logical unit numbers (LUNs) associated with data stored on the plurality of disk drives;
    defining connections between said one of the plurality of RAID controllers and one or more disk drives contained in each of two or more of the plurality of disk drive modules, a number of the one or more disk drives not exceeding the maximum number;
    wherein identifying the maximum number of disk drives further comprises:
        selecting a number of disk drives to be missing from any one of the plurality of LUNs;
        finding the RAID management algorithm in accordance with the selected number;
        evaluating performance of the RAID management algorithm; and
        if a result of the evaluation is satisfactory, considering the maximum number to be equal to the selected number.

2. The method of claim 1 wherein the selected number is specified by a user.

3. The method of claim 1 further comprising:
    if the result of evaluation is not satisfactory, modifying the selected number.

4. The method of claim 1 wherein one of the plurality of disk drive modules comprises at least two of the plurality of disk drives and one of the plurality of RAID controllers.

5. The method of claim 1 wherein the plurality of RAID controllers includes a number of sets of associated RAID controllers.

6. The method of claim 1 wherein each of the plurality of disk drive modules is a blade connector having mounted thereon at least two of the plurality of disk drives.

7. A computer-readable storage medium containing executable instructions which, when executed by a processing system, cause the processing system to perform a method, the method comprising:
    identifying a maximum number of disk drives within any one of the plurality of disk drive modules that can be connected to one of a plurality of RAID controllers, wherein the maximum number is based on a RAID management algorithm and is the number of disk drives permitted to be missing from any one of a plurality of logical unit numbers (LUNs) associated with data stored on the plurality of disk drives; and
    defining connections between said one of the plurality of RAID controllers and one or more disk drives contained in each of two or more of the plurality of disk drive modules, a number of the one or more disk drives not exceeding the maximum number;
    wherein identifying the maximum number of disk drives further comprises:
        selecting a number of disk drives to be missing from any one of the plurality of LUNs;
        finding the RAID management algorithm in accordance with the selected number;
        evaluating performance of the RAID management algorithm; and
        if a result of the evaluation is satisfactory, considering the maximum number to be equal to the selected number.

8. The computer-readable storage medium of claim 7 wherein the selected number is specified by a user.

9. The computer-readable storage medium of claim 7 wherein the method further comprises:
    if the result of evaluation is not satisfactory, modifying the selected number.

10. The computer-readable storage medium of claim 7 wherein one of the plurality of disk drive modules comprises at least two of the plurality of disk drives and one of the plurality of RAID controllers.

11. The computer-readable storage medium of claim 7 wherein the plurality of RAID controllers includes a number of sets of associated RAID controllers.

12. The computer-readable storage medium of claim 7 wherein each of the plurality of disk drive modules is a blade connector having mounted thereon at least two of the plurality of disk drives.

13. A method of facilitating availability of data in a RAID system in which each of a plurality of disk drive modules comprises at least two of a plurality of disk drives, the method comprising:
- identifying a maximum number of disk drives within any one of the plurality of disk drive modules that can be connected to one of a plurality of RAID controllers, wherein the maximum number is based on a RAID management algorithm and is the number of disk drives permitted to be missing from any one of a plurality of logical unit numbers (LUNs) associated with data stored on the plurality of disk drives;
- defining connections between said one of the plurality of RAID controllers and one or more disk drives contained in each of two or more of the plurality of disk drive modules, a number of the one or more disk drives not exceeding the maximum number;
- wherein identifying the maximum number of disk drives further comprises:
  - selecting the RAID management algorithm for the RAID system;
  - evaluating performance of the RAID management algorithm; and
  - if the evaluation result is satisfactory, considering the maximum number to be equal to a number of disk drives that is permitted by the RAID management algorithm to be missing from any of the plurality of LUNs while preventing loss of data within said any of the plurality of LUNs.

14. The method of claim 13 wherein one of the plurality of disk drive modules comprises at least two of the plurality of disk drives and one of the plurality of RAID controllers.

15. The method of claim 13 wherein the plurality of RAID controllers includes a number of sets of associated RAID controllers.

16. The method of claim 13 wherein each of the plurality of disk drive modules is a blade connector having mounted thereon at least two of the plurality of disk drives.

17. A computer-readable storage medium containing executable instructions which, when executed by a processing system, cause the processing system to perform a method, the method comprising:
- identifying a maximum number of disk drives within any one of the plurality of disk drive modules that can be connected to one of a plurality of RAID controllers, wherein the maximum number is based on a RAID management algorithm and is the number of disk drives permitted to be missing from any one of a plurality of logical unit numbers (LUNs) associated with data stored on the plurality of disk drives; and
- defining connections between said one of the plurality of RAID controllers and one or more disk drives contained in each of two or more of the plurality of disk drive modules, a number of the one or more disk drives not exceeding the maximum number;
- wherein identifying the maximum number of disk drives further comprises:
  - selecting a RAID management algorithm for the RAID system;
  - evaluating performance of the RAID management algorithm; and
  - if the evaluation result is satisfactory, considering the maximum number to be equal to a number of disk drives that is permitted by the RAID management algorithm to be missing from any of the plurality of LUNs while preventing loss of data within said any of the plurality of LUNs.

18. The computer-readable storage medium of claim 17 wherein one of the plurality of disk drive modules comprises at least two of the plurality of disk drives and one of the plurality of RAID controllers.

19. The computer-readable storage medium of claim 17 wherein the plurality of RAID controllers includes a number of sets of associated RAID controllers.

20. The computer-readable storage medium of claim 17 wherein each of the plurality of disk drive modules is a blade connector having mounted thereon at least two of the plurality of disk drives.

* * * * *